H. Abbott,
Water Wheel,
Nº 26,224.  Patented Nov. 22, 1859.
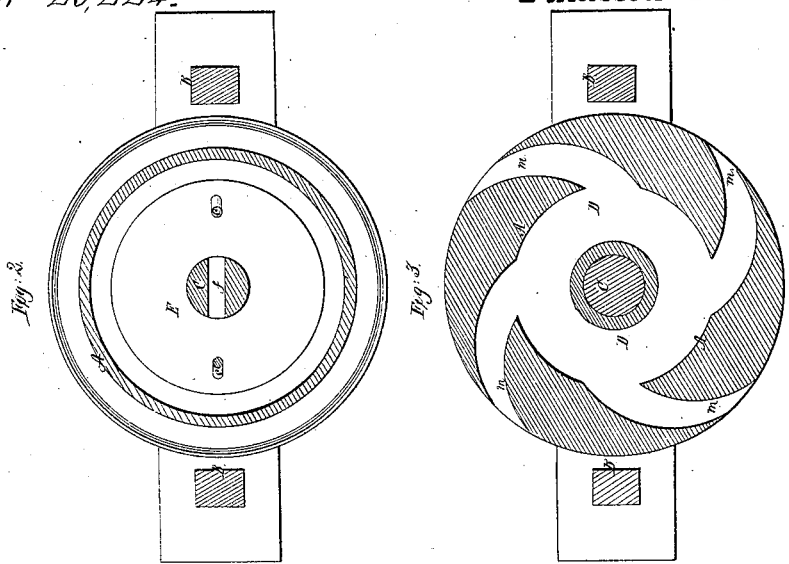
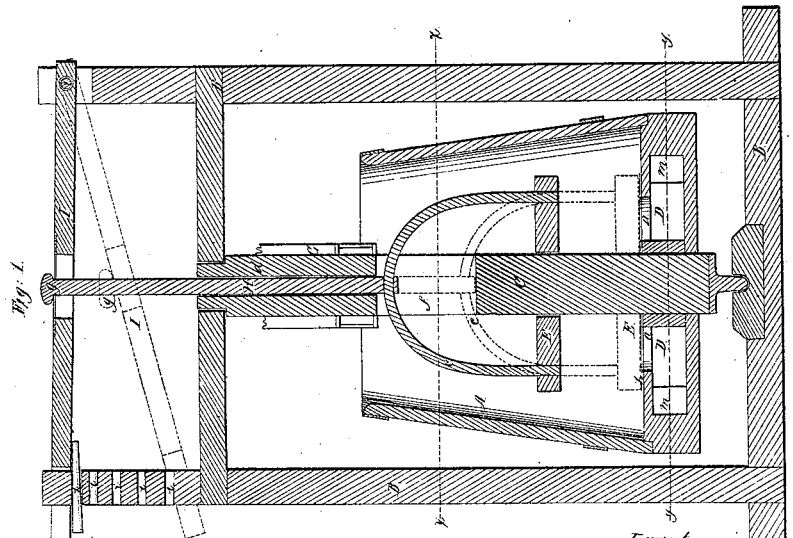

UNITED STATES PATENT OFFICE.

HARRY ABBOTT, OF NORTH HURON, NEW YORK, ASSIGNOR TO HIMSELF AND EMERSON ABBOTT, OF SAME PLACE.

IMPROVEMENT IN CENTRIFUGAL WATER-WHEELS.

Specification forming part of Letters Patent No. 26,224, dated November 22, 1859.

*To all whom it may concern:*

Be it known that I, HARRY ABBOTT, of North Huron, in the county of Wayne and State of New York, have invented a new and Improved Water-Wheel; and I do hereby declare that the following is a full and exact description thereof, reference being had to the accompanying drawings, making part of this specification.

Figure 1 is a central vertical section of the water-wheel; Fig. 2, a horizontal section thereof in the plane indicated by the line $x\,x$, Fig. 1, and Fig. 3 a horizontal section in the plane indicated by the line $y\,y$, Fig. 1.

Like letters designate corresponding parts in all the figures.

The water-wheel in its simplest form consists of a tub A, of a height determined by the height of the fall of water, and of suitable diameter to transmit the amount of water required, there being a discharging-chamber D at the bottom thereof, and orifices $m\,m$, leading from said chamber through the periphery of the water-wheel, through which the water is discharged, and turns the water-wheel by the power of its reaction. The ajutages may be of any good and well-known form. Its shaft or spindle C is vertical and is mounted in any convenient frame-work B. A concentric aperture $a$ admits the water from the tub above into the discharge-chamber D, and this aperture is closed or controlled by means of a gate or valve E, which surrounds the shaft C, and is adjustable up and down by any convenient means.

The mode represented in the drawings consists of a rod H, located in the center of the spindle C, and connected with the valve by a bail $c$, which is allowed to move up and down in a slot $f$, through said spindle, as shown in the drawings. The bail prevents the valve's turning around in the water-wheel. The upper end of the rod H terminates in a head $g$ or its equivalent, by which the whole may be connected with a lever I, and still turn independently thereof for the purpose of raising and lowering the valve. The lever is hinged by one end at $l$, and its other end is movable up and down and held at any desired height by a pin $h$, passed through any one of a set of holes $i\,i$ in the frame-work. Any other convenient means of raising and lowering the valve while the water-wheel is in motion may be employed. There may be packing $b$ around the orifice $a$ or on the bottom of the valve, so that the latter may tightly close the former when let entirely down thereon.

The water is admitted into the top of the water-wheel through a suitable spout G, which is made to deliver as much water to the water-wheel as the orifices $m\,m$ can discharge therefrom. The direction and position of the spout should be such in relation to the water-wheel as to deliver the water thereto in the direction of the water-wheel's motion, and thereby to add the power of the momentum of the water to the effective power of the water-wheel.

A water-wheel constructed substantially as above set forth, with an adjustable valve therein, has several advantages. The valve is employed to stop the water-wheel, irrespective of the gate in the spout or sluice G, which may be closed or not, as desired. By adjusting the valve to a proper height, also, it regulates the amount of water allowed to flow from the water-wheel, so that the discharge may be exactly proportioned to the supply, and thus the water-wheel be kept full, and this without the loss of water by flowing over the top of the wheel—a desideratum of consequence, especially when water is scarce or the maximum effect is desired to be obtained from it. The valve also affords by the same adjustment the simplest and readiest means of varying and exactly controlling the velocity of the wheel to suit the work to be done.

The simplicity, cheapness, and compactness of the whole arrangement, together with the ease and facility of managing the water-wheel, are likewise considerations of importance and value.

What I claim as my invention, and desire to secure by Letters Patent, is—

The combination, with a centrifugal water-wheel A, of a valve E, located and arranged within said wheel, so as to turn with it, and at the same time be adjustable while the wheel is in motion by means of the bail $c$, concentric rod H, and adjusting-lever I, substantially as herein set forth.

In witness that the above is a true specification of my improved water-wheel I hereunto set my hand this 24th day of May, 1859.

HARRY ABBOTT.

Witnesses:
 DANIEL DOWD,
 S. E. DOWD.